US012472747B2

(12) United States Patent
Alvarez et al.

(10) Patent No.: US 12,472,747 B2
(45) Date of Patent: Nov. 18, 2025

(54) SYSTEM AND METHOD FOR REDUCING PLASTIC WASTE IN INKJET PRINTERS

(71) Applicant: Xerox Corporation, Norwalk, CT (US)

(72) Inventors: Jorge A. Alvarez, Webster, NY (US); Seemit Praharaj, Webster, NY (US); Jason M. LeFevre, Penfield, NY (US); Anthony S. Condello, Webster, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 166 days.

(21) Appl. No.: 18/462,790

(22) Filed: Sep. 7, 2023

(65) Prior Publication Data

US 2025/0083443 A1 Mar. 13, 2025

(51) Int. Cl.

*B41J 2/17* (2006.01)
*B41J 2/165* (2006.01)
*B41J 2/175* (2006.01)

(52) U.S. Cl.

CPC ........... *B41J 2/1721* (2013.01); *B41J 2/1652* (2013.01); *B41J 2/1752* (2013.01); *B41J 2/17559* (2013.01); *B41J 2/17566* (2013.01); *B41J 2002/16594* (2013.01); *B41J 2/1735* (2024.05)

(58) Field of Classification Search

CPC ...... B41J 2/1721; B41J 2/1652; B41J 2/1752; B41J 2/17559; B41J 2/17566; B41J 2/1735; B41J 2002/16594; B41J 2002/17516; B41J 2/16523; B41J 2/16526; B41J 2/175; B41J 2/17513; B41J 2/17556; B41J 2/16508

USPC ........................................................... 347/36

See application file for complete search history.

(56) References Cited

U.S. PATENT DOCUMENTS

| | | | | |
|---|---|---|---|---|
| 5,157,421 | A | 10/1992 | Kitahara | |
| 5,221,935 | A | 6/1993 | Uzita | |
| 5,381,172 | A * | 1/1995 | Ujita | B41J 2/17513 347/86 |
| 5,400,066 | A | 3/1995 | Matsumoto et al. | |

(Continued)

FOREIGN PATENT DOCUMENTS

JP 2010089379 A 4/2010

OTHER PUBLICATIONS

Extended European Search Report corresponding to European Application No. 24194355.4, dated Jan. 21, 2025. (7 Pages).

*Primary Examiner* — Jason S Uhlenhake
*Assistant Examiner* — Alexander D Shenderov
(74) *Attorney, Agent, or Firm* — Maginot Moore & Beck LLP

(57) ABSTRACT

An inkjet printer uses ink supply containers that includes bladders for holding waste fluids produced by printhead maintenance stations. The bladders are connected serially or in parallel to the output ports of the printhead maintenance stations to store waste fluids within the bladders of the ink supply containers. As the ink supply containers are depleted of their supply ink, they are replaced and new ink supply containers having bladders within them are installed to renew the capacity of the printer to store waste fluids. In two embodiments, the need for a waste fluid reservoir is eliminated and in a third embodiment, the operational life of a waste fluid reservoir is extended. In all of these embodiments, the production of plastic waste by the printer is reduced.

27 Claims, 8 Drawing Sheets

(56) References Cited

U.S. PATENT DOCUMENTS

| | | | | |
|---|---|---|---|---|
| 5,611,461 | A * | 3/1997 | Kubota ................ | B41J 2/17513 222/105 |
| 6,281,911 | B1 | 8/2001 | Nakazawa et al. | |
| 6,874,877 | B2 * | 4/2005 | Gaston ................. | B41J 2/17513 347/85 |
| 2007/0008372 | A1 * | 1/2007 | Katada ................... | B41J 2/1721 347/36 |
| 2013/0335481 | A1 | 12/2013 | Jo | |
| 2014/0063149 | A1 * | 3/2014 | Sato ..................... | B41J 2/17503 347/86 |
| 2017/0253043 | A1 | 9/2017 | Hagen et al. | |

* cited by examiner

SYSTEM AND METHOD FOR REDUCING PLASTIC WASTE IN INKJET PRINTERS

TECHNICAL FIELD

This disclosure relates generally to devices that produce ink images on media, and more particularly, to the reducing of plastic waste produced by such printers.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in the cross-process direction to double the number of pixels per inch to increase the density of a line of the color of ink ejected by the printheads in the two modules. As used in this document, the term "process direction" means the direction of movement of the image receiving surface as it passes the printheads in the printer and the term "cross-process direction" means a direction that is perpendicular to the process direction in the plane of the image receiving surface.

Inkjets, especially those in printheads that eject aqueous inks, need to fire regularly to help prevent the ink in the nozzles from drying. Sometimes the nozzles in a printhead dry because the inkjets have ejected a substantial amount of ink to form high coverage areas in an ink image. The operation of a high proportion of inkjets in a portion of the faceplate on the printhead can produce a high number of satellite drops that tend to adhere to the faceplate. Satellite drops are small ink drops that separate from the larger drops that travel from the nozzles to the image receiving substrates. The buildup of these satellite drops on a faceplate can clog nozzles in the faceplate. Additionally, if the inkjets in a printhead are not operated frequently enough, such as when low ink area coverage image portions are printed, then the ink within an inkjet can dry and render the inkjet inoperative. To maintain the operational status of the inkjets, the printhead modules are moved from positions opposite the path of the image receiving substrates to printhead maintenance stations where the printheads are purged. Purging a printhead means a pressurized gas or liquid is applied to the ink supply chambers within a printhead to force ink from the chamber into the nozzles where the ink is emitted from the nozzles onto the faceplate. One or more wipers are then moved across the faceplate to remove the purged ink from the faceplate into a waste ink receptacle.

Treatment of the waste ink can present environmental issues. FIG. 5 shows a set of printhead modules 34A, 34B, 34C, and 34D being positioned opposite printhead maintenance stations 36A, 36B, 36C, and 36D in a prior art inkjet printer. The trays in the printhead maintenance stations collect the purged ink and ink rinse fluid wiped from the faceplates of the printheads in the printhead modules as the maintenance procedure is performed on the printheads. The purged ink and ink rinse fluid is pumped from the printhead maintenance stations to the waste fluid reservoir 38. The printheads in each of the printhead modules 34A, 34B, 34C, and 34D are supplied with ink of an appropriate color from ink containers 32A, 32B, 32C, and 32D, respectively. When the ink containers are emptied, a signal is generated to indicate that the exhausted ink supply container needs to be replaced with a new ink supply container. Additionally, when the waste fluid reservoir reaches a predetermined maximum level, a signal is generated so the waste fluid reservoir can be replaced with an empty waste fluid reservoir. The ink containers and the waste fluid reservoir are typically made of hard plastic so the disposal of these containers contributes to landfill issues and the like. Thus, inkjet printers would benefit from being able to treat waste ink in a manner that reduces the production of plastic waste by the printers.

SUMMARY

A color inkjet printer is configured to collect waste fluids in a manner that reduces the production of plastic waste by the printer. The color inkjet printer includes at least one printhead maintenance station configured to perform at least one purge cycle on at least one printhead in the inkjet printer to produce waste fluids; and at least one ink supply container having a bladder positioned within an internal volume of the ink supply container, the bladder being fluidly coupled to the printhead maintenance system to receive waste fluids from the printhead maintenance station.

A method of operating a color inkjet printer collects waste fluids in a manner that reduces the production of plastic waste by the printer. The method includes performing at least one purge cycle on at least one printhead in the inkjet printer to produce waste fluids; and directing the waste fluids into at least one ink supply container having a bladder positioned within an internal volume of the ink supply container.

An ink supply container is configured to collect waste fluids in a manner that reduces the production of plastic waste by the printer. The ink supply container includes a housing having an internal volume configured to hold a volume of ink; a bladder positioned within the internal volume of the housing; and an input connector on the housing, the input connector being configured to enable fluid to enter the bladder positioned within the housing.

BRIEF DESCRIPTION OF THE DRAWINGS

The foregoing aspects and other features of a color inkjet printer, color inkjet printer operational method, and ink supply container that reduces the plastic waste produced by an inkjet printer are explained in the following description, taken in connection with the accompanying drawings.

DETAILED DESCRIPTION

Figure 1:
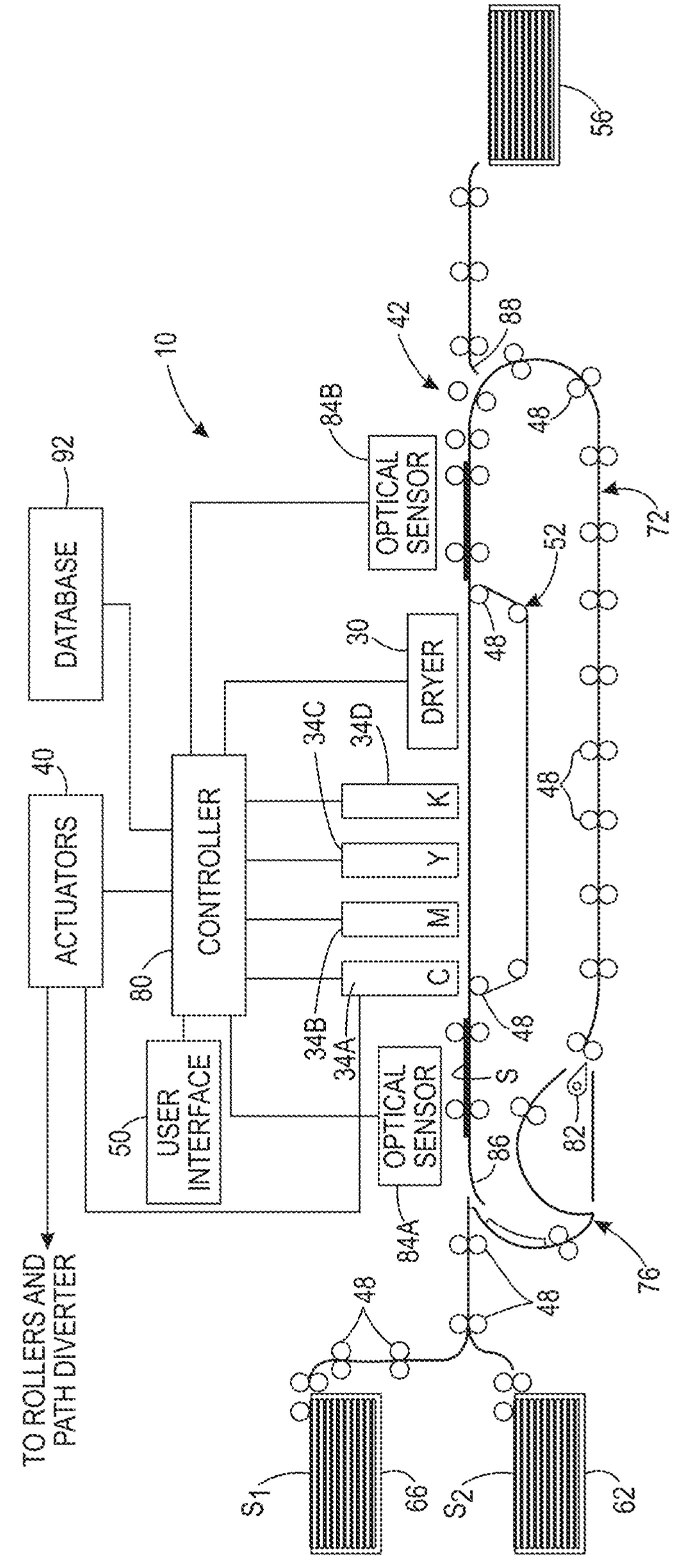
FIG. 1 is a schematic drawing of a color inkjet printer that collects waste fluids in a manner that reduces the production of plastic waste by the inkjet printer.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

FIG. 1 depicts a high-speed color inkjet printer 10 that uses newly configured ink containers to collect waste fluids produced by printhead maintenance stations to reduce the production of plastic waste by the inkjet printer. As used in this document, the term "waste fluids" means the fluids produced by performing printhead maintenance procedures on printheads in an inkjet printer. These waste fluids include but are not limited to faceplate rinse fluids and ink purged from the nozzles of a printhead. As illustrated, the printer 10 is a printer that directly forms an ink image on a surface of a media sheet stripped from one of the supplies 66 or 62 of media sheets S1 or S2 and the sheets S are moved through the printer 10 by the controller 80 operating one or more of the actuators 40 that are operatively connected to rollers 48 or to at least one driving roller of conveyor 52 that comprise a portion of the media transport 42 that passes through the print zone of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

With further reference to FIG. 1, the printed image exits the print zone of printer 10 and passes under an image dryer 30 after the ink image is printed on a sheet S. As used in this document, the term "print zone" means an area of a media transport opposite the printheads of an inkjet printer. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Controller 80 operates at least one of the actuators 40 to rotate a pivoting member at position 88 to either direct a sheet to receptacle 56 or to return path 72. A sheet S is moved by the rotation of rollers along the return path 72 in a direction opposite to the direction of movement in the process direction past the printheads. Pivoting member 82 is operated by the controller 80 to either direct the sheet along a curved portion of the return path 72 into inverter 76 so the sheet is turned over for duplex printing or along the straight portion of the return path 72. When the sheet follows the straight portion, the inverter 76 is bypassed and the side of the sheet previously printed can be printed again. The controller operates one of the actuators 40 to move the pivoting member 82 clockwise to direct a sheet into the inverter 76 and counterclockwise to bypass the inverter. Regardless of whether the substrate is inverted or not, it merges into the job stream being carried by the media transport 42 when controller 80 operates another actuator 40 to rotate pivoting member 86 to provide ingress of a sheet S from return path 72 to the job stream entering the print zone.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are printed at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the controller 80 reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory computer readable medium associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 2A:
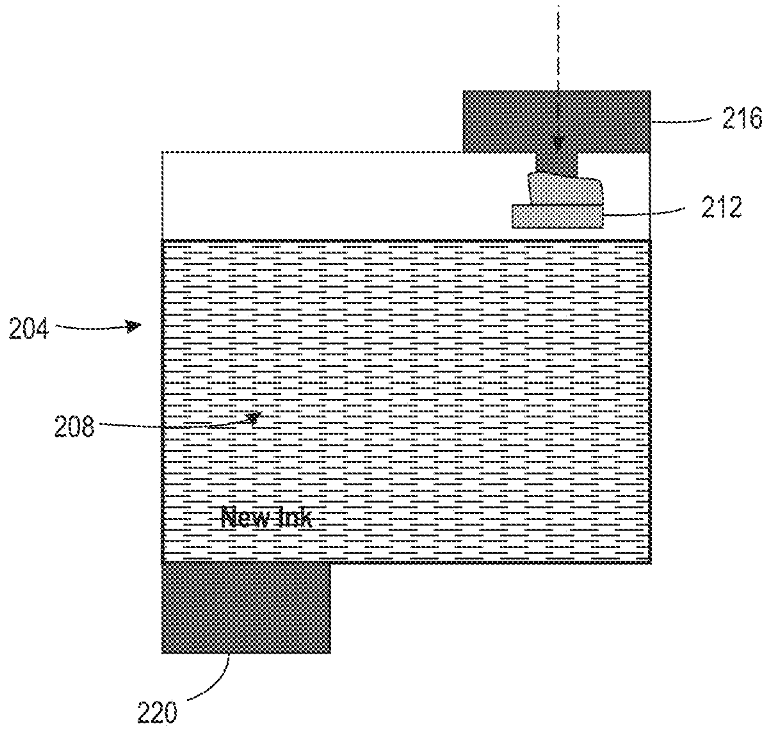
FIG. 2A is a cross-sectional view of a new ink supply container that includes a waste fluid bladder when the container is installed and FIG. 2B is a cross-sectional view of the ink container when the ink supply container is near depletion.
Figure 2B:
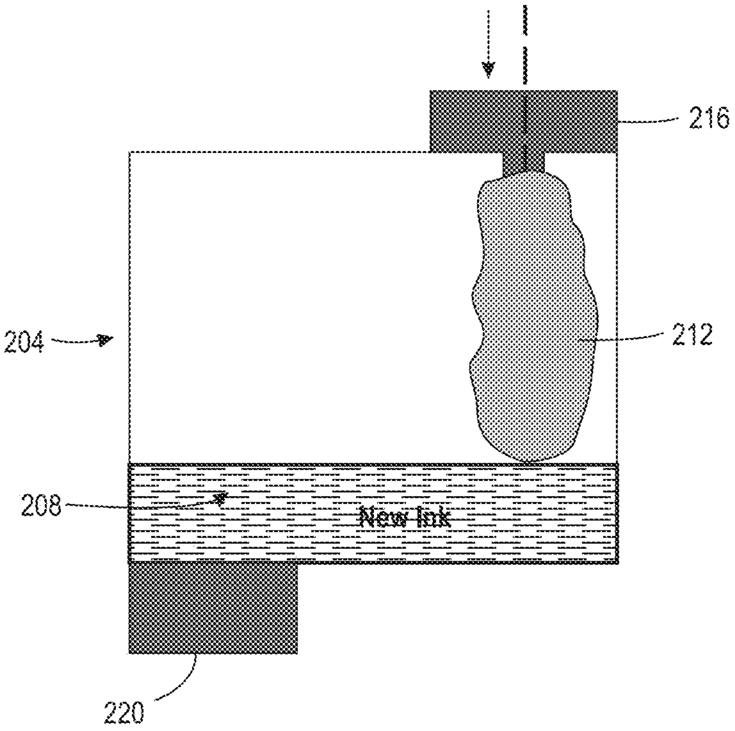

FIG. 2A shows a cross-sectional view of an ink supply container 204 that includes a bladder 212 and a connection 216 that enables the bladder to be filled with waste fluids as the ink supply 208 within the container is depleted. Three different connection configurations are described below with reference to FIG. 3A, FIG. 3B, and FIG. 3C for moving waste fluids into the bladder 212 of an ink supply container 204. FIG. 2B is a cross-sectional view of the ink supply container 204 after the ink supply 208 has been nearly emptied and the bladder has expanded as the ink level lowers and the bladder is filled with waste fluids. The bladder 212 is made of polymeric material that is flexible so the volume within the bladder increases as it is filled with waste fluids and the volume of ink occupying the internal cavity of the ink supply container decreases. The bladder hangs from the input connection without any supporting structure within the internal volume of the ink supply container. The housing of the ink container 204 is a hard plastic bottle or container as known in the art. Hard plastics include, but are not limited to, acetals, acrylic, polyimides, glass epoxies, thermoset plastics, high impact polystyrene, poly carbonate, poly vinyl chloride, and the like. As used in this document, the term "bladder" means a flexible member having an internal volume configured to be fluidly connected to a source of incoming fluid. The flexible bladder can be made of a high-density polyethylene (HDPE) material. The thickness of the bladder wall ranges from 75 to 300 microns to adequately prevent waste fluid leaks and still provide bladder flexibility. Other choices for bladder material are polypropylene (PP) or linear low-density polyethylene (LLDPE) using a similar wall thickness to prevent leaks and still be flexible. While the materials are flexible, they are not expandable to form an increasingly large volume. Instead, the expandable bladder has a predetermined volume that can be accommodated by the internal volume of the ink supply container. Bio plastics are not good materials for bladders as their ability to resist being compromised by the chemicals in the various inks used in inkjet printing is unknown.

The bladder is installed within the internal volume of an ink supply container in a folded or rolled configuration. As the ink volume in the container drops, the bladder unfolds or unrolls to provide a volume within the bladder that can be filled with waste fluids. Thus, the bladder and the waste fluids within the bladder are supported by the ink within the ink supply container until the bladder end reaches the floor of the ink supply container. The ink output port and the bladder input port can be sized differently to help ensure that the bladder input port is not connected to an ink input port for a printhead and to prevent a waste fluid conduit being connected to the ink output port of an ink supply container. Additionally, the waste fluid input port and the ink output port can be positioned on different sides of the ink supply container to facilitate distinguishing the two ports at the time of ink supply container installation and removal. Additionally, one way valves or no-drip shutoff values can be included in the input and output ports of an ink supply container to ensure that no ink or waste fluid drips occur during installation or removal of an ink supply container.

Figure 3A:
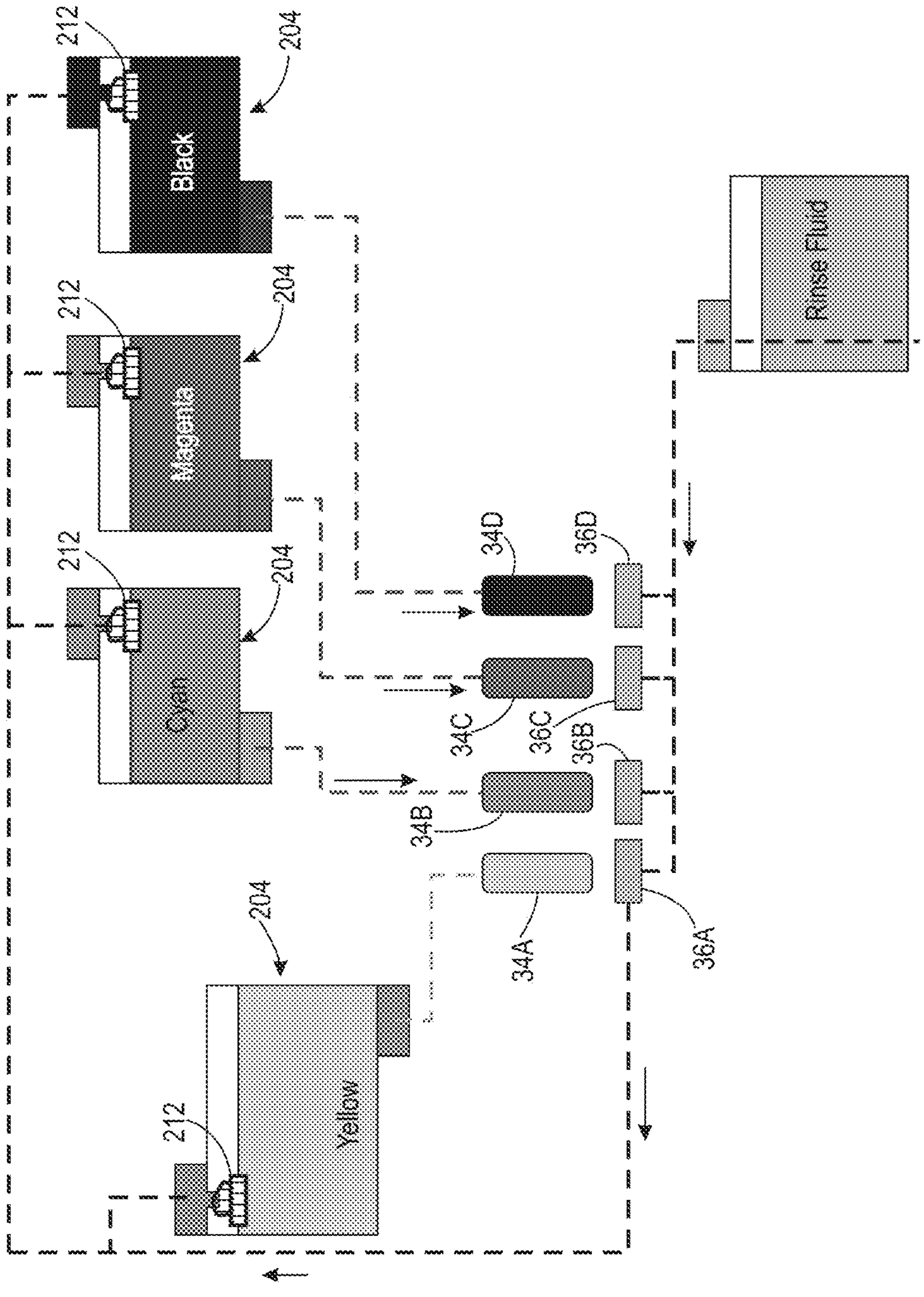
FIG. 3A shows serial fluid connections between the printhead maintenance stations in the inkjet printer of FIG. 1 to ink supply containers configured as shown in FIG. 2A and FIG. 2B.
Figure 5:
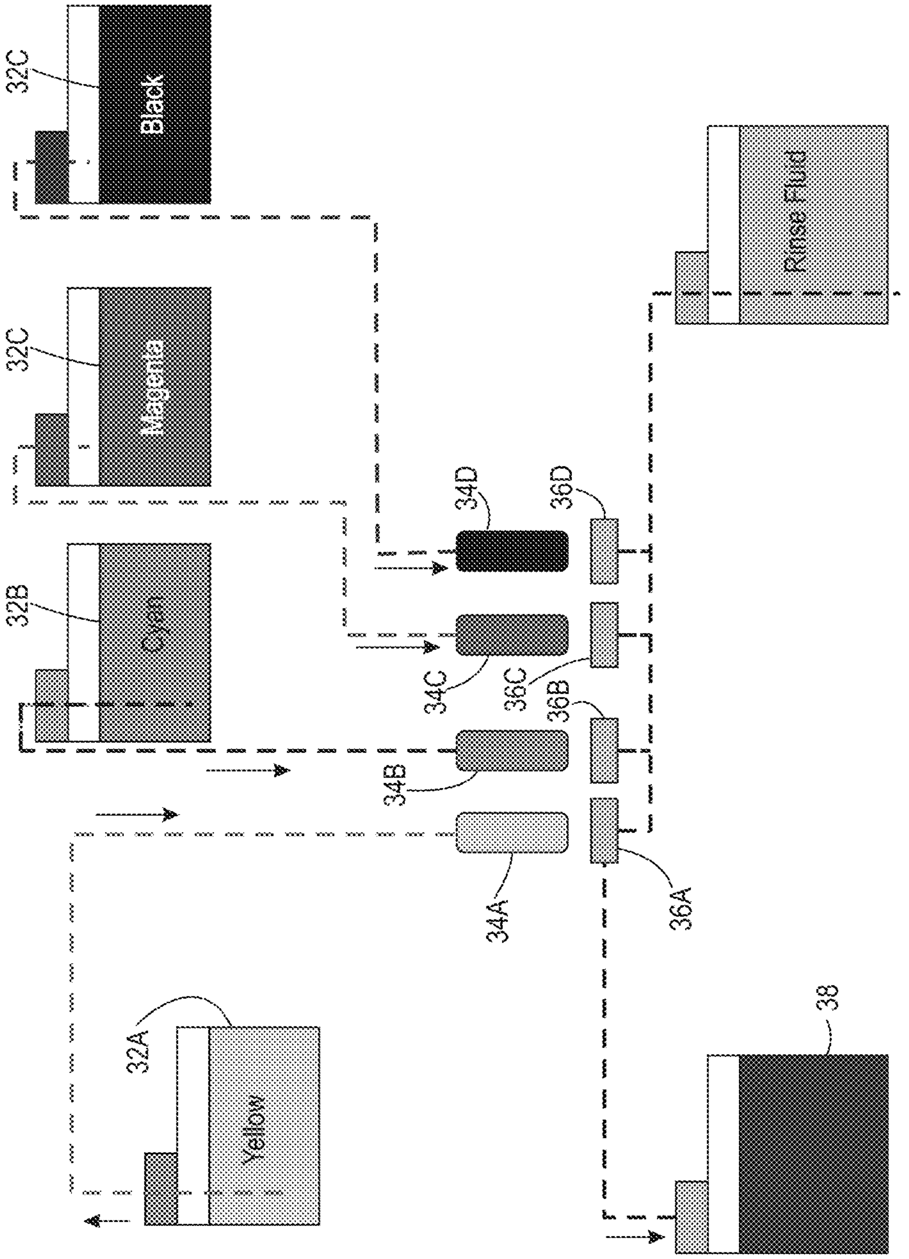
FIG. 5 Prior Art
FIG. 5 shows the collection of waste fluids in a prior art inkjet printer.

In the configuration shown in FIG. 3A, each of the ink supply containers 32A, 32B, 32C, and 32D have been configured as the ink supply container 204 described with reference to FIG. 2A and FIG. 2B to include a bladder 212 and a bladder connector 216. In FIG. 3A, no waste fluid container 38 as shown in the prior art ink supply system of FIG. 5 has been included. Instead, the waste fluid outputs of the printhead maintenance stations 36A, 36B, 36C, and 36D have been serially connected together in a single conduit that is fluidly connected to each of the bladder connections for ink supply containers 32A, 32B, 32C, and 32D. As the waste fluids flow through this conduit, they arrive first at the bladder connector 216 of the ink supply container 32A to fill the bladder 212 of this container. As the bladder 212 fills it expands but begins to approach the capacity of its internal volume increasing the pressure against flow into the bladder. Consequently, more of the volume of waste fluids flowing through the conduit begin to migrate to the bladder connector 216 for the bladder 212 in ink supply container 32B. This sequential filling of the bladders 212 in the ink supply containers 32A, 32B, 32C, and 32D continues until an ink supply container is exhausted of supply ink and is replaced. In this manner, the capacity of the bladders in the ink supply containers for waste fluids is replenished.

Figure 3B:
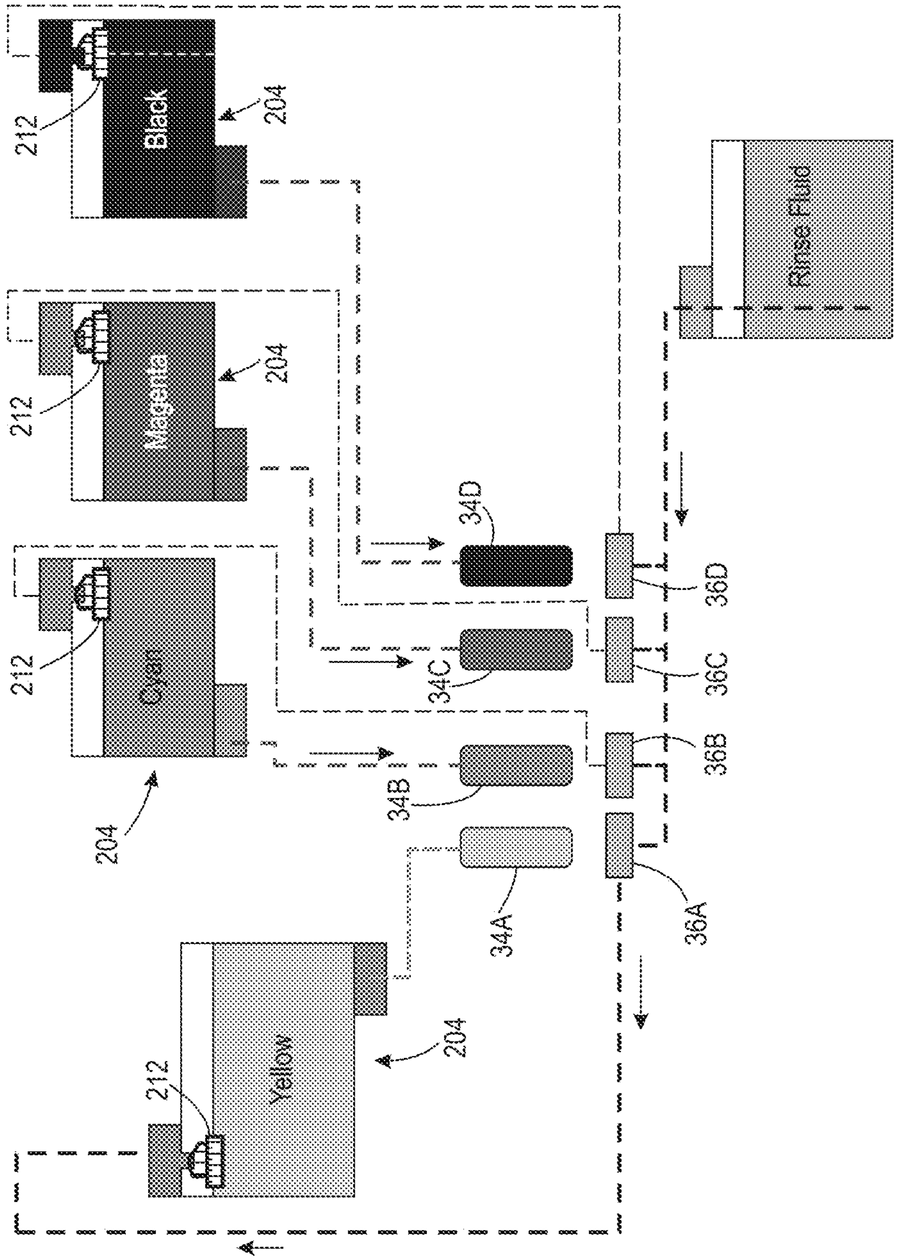
FIG. 3B shows parallel fluid connections between the printhead maintenance stations in the inkjet printer of FIG. 1 to ink supply containers configured as shown in FIG. 2A and FIG. 2B.

The configuration shown in FIG. 3B differs from the configuration shown in FIG. 3A because the waste fluid outputs of the printhead maintenance stations 36A, 36B, 36C, and 36D have been connected in parallel to the bladder connections for ink supply containers 32A, 32B, 32C, and 32D, respectively. Again, each of the ink supply containers 32A, 32B, 32C, and 32D have been configured as the ink supply container 204 of FIG. 2A to include a bladder 212 and a bladder connector 216 and, no waste fluid container 38 as shown in the prior art ink supply system of FIG. 5 has been included. Thus, in the configurations shown in FIG. 3A and FIG. 3B, the waste fluid reservoir 38 has been eliminated so the plastic waste produced when the reservoir is filled and replaced is also eliminated. As the waste fluids flow from each printhead maintenance station to the respective ink supply container, they enter the bladders 212 of the respective ink supply containers. As the bladders 212 fill, they expand but printing operations deplete the ink supplies 208 within the ink supply containers at a faster rate than the printhead maintenance units produce waste fluid for the bladders. This parallel filling of the bladders 212 in the ink supply containers 32A, 32B, 32C, and 32D continues until an ink supply container is exhausted of supply ink and is replaced. In this manner, the capacity of the bladders in the ink supply containers for waste fluids is replenished.

Figure 3C:
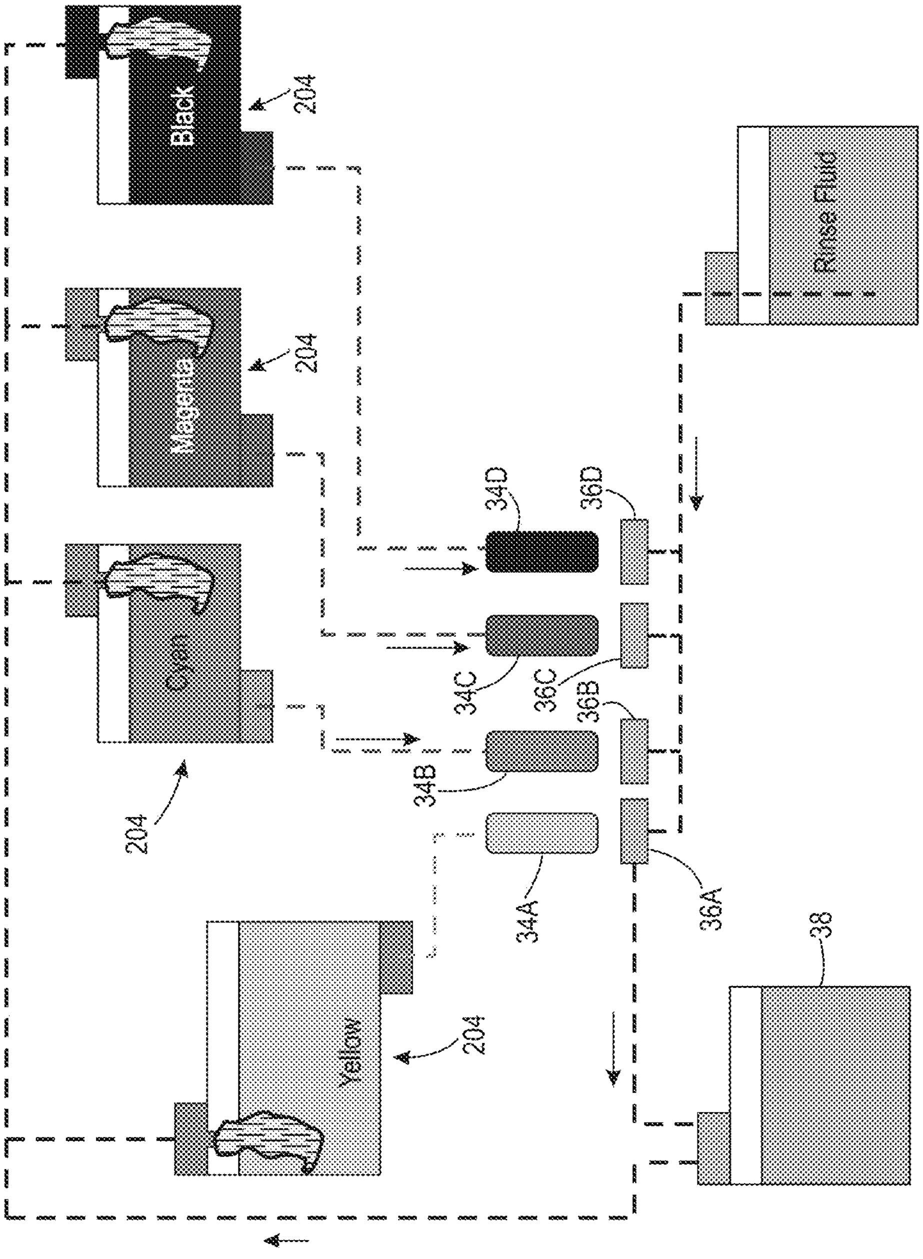
FIG. 3C shows serial fluid connections between the printhead maintenance stations in the inkjet printer of FIG. 1 to a waste fluid reservoir and serial connections from the waste ink reservoir to the ink supply containers configured as shown in FIG. 2A and FIG. 2B.

In the configuration shown in FIG. 3C, each of the ink supply containers 32A, 32B, 32C, and 32D have been configured as the ink supply container 204 in FIG. 2A to include a bladder 212 and a bladder connector 216. In FIG. 3C, however, a waste fluid container 38 as shown in the prior art ink supply system of FIG. 5 has been retained. Again, the waste fluid outputs of the printhead maintenance stations 36A, 36B, 36C, and 36D have been serially connected together into a single conduit that is fluidly connected to the waste fluid reservoir 38 so the waste fluid reservoir receives the combined waste fluid flow from the printhead maintenance stations. Either on a periodic time basis or upon detection of the waste fluid within the waste fluid reservoir reaching a predetermined level, a pneumatic device connected to the output port of the waste fluid reservoir is activated to pump waste fluid from the waste fluid reservoir 38 to the serially connected bladder connectors 216 for ink supply containers 32A, 32B, 32C, and 32D. As the waste fluids flow to the serially connected bladder connectors, they arrive first at the bladder connector 216 of the ink supply container 32A to fill the bladder 212 of this container. As the bladder 212 fills it expands but begins to approach the capacity of its internal volume increasing the pressure against flow into the bladder. Consequently, more of the volume of waste fluids flowing through the conduit begin to migrate to the bladder connector 216 for the bladder 212 in ink supply container 32B. This sequential filling of the bladders 212 in the ink supply containers 32A, 32B, 32C, and 32D continues until an ink supply container is exhausted of supply ink and is replaced. In this manner, the capacity of the bladders in the ink supply containers for waste fluids is replenished. Additionally, the operational life of the waste fluid reservoir is extended since it is not replaced once it has received a volume of waste fluid that equals the internal volume of the reservoir. Instead, the capacity of the waste fluid reservoir is increased by the capacities of the bladders connected to the output port of the waste fluid reservoir and their replacement when they are depleted. In the embodiment in which a predetermined fluid level within the waste fluid reservoir is detected to operate the pneumatic device, a fluid level sensor is configured to generate a signal indicative of the fluid level within the waste fluid reservoir and a controller, such as controller 80, is operatively connected to the fluid level sensor and the pneumatic device and is configured to receive the signal from the fluid level sensor to detect when the predetermined level is reached and operate the pneumatic device. In one embodiment, the pneumatic device is a pump.

Figure 4:
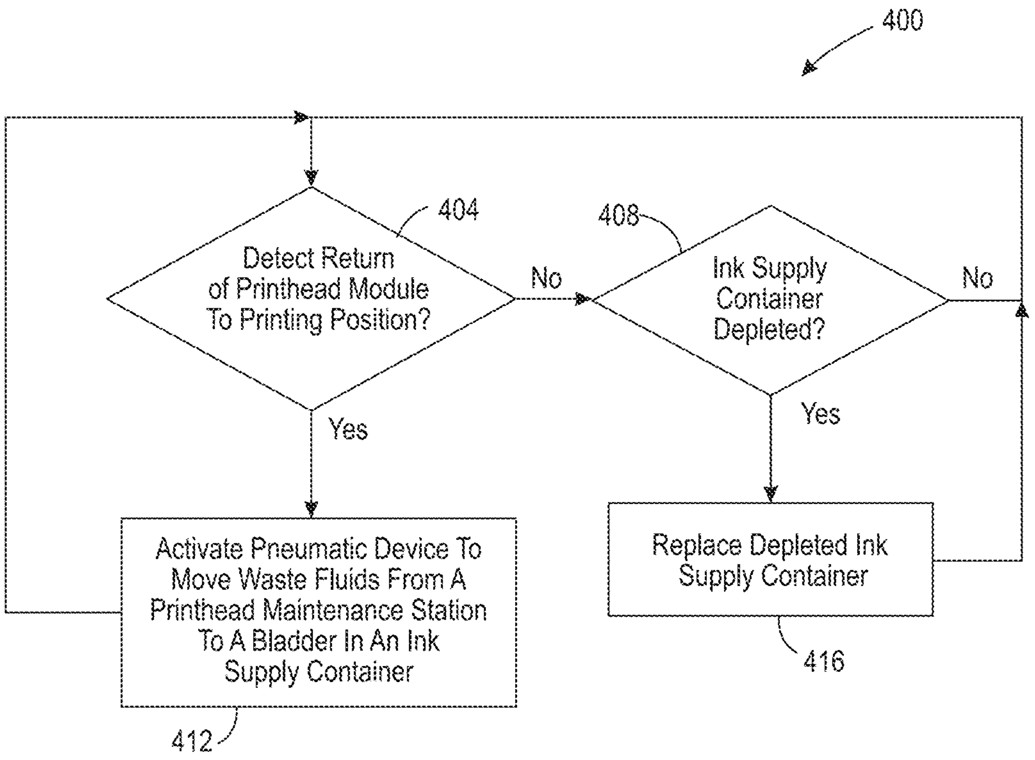
FIG. 4 is a flow diagram for operating the inkjet printer of FIG. 1.

A process 400 for operating the inkjet printer of FIG. 1 to reduce the production of plastic waste by the printer is shown in FIG. 4. In the description of the process, statements that the process is performing some task or function refers to a controller or general purpose processor executing programmed instructions stored in non-transitory computer readable medium operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to perform one or more tasks or functions described herein. Additionally, the steps of the method may be performed in any feasible chronological order, regardless of the order shown in the figures or the order in which the processing is described.

The process 400 of FIG. 4 begins by detecting the return of at least one printhead module to its printing position after at least one purge cycle has been performed on at least one printhead in the at least one printhead module (block 404). If one is detected, then the pneumatic device 208 connected to a waste ink receptacle within a printhead maintenance station is activated and waste fluids are moved from the printhead maintenance stations to one or more bladders in the ink supply containers (block 408). As noted previously, these waste fluids can flow together in a single conduit to the serially connected bladder connectors of the ink supply containers or flow in parallel to the bladder connectors of the ink supply containers respectively connected to the printhead maintenance stations or flow to a waste fluid reservoir before being removed from the waste fluid reservoir and sent to the serially connected bladder connections of the ink supply containers. If no return of a printhead module is detected (block 404), then the process determines if depletion of an ink supply container is detected (block 412). If an exhausted ink supply container is detected, then the depleted ink supply container is replaced and the capacity of the waste fluid system is replenished (block 416). The process continues checking for the end of printhead module maintenance cycles and depleted ink supply containers indefinitely in printers in which the printhead maintenance stations are connected to the bladder connectors of ink supply containers serially or in parallel. In the configuration having a waste fluid reservoir, the process continues until the operational life of the waste fluid reservoir is reached and the reservoir is replaced.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
at least one printhead maintenance station configured to perform at least one purge cycle on at least one printhead in the inkjet printer to produce waste fluids; and
at least one ink supply container having a bladder positioned within an internal volume of the ink supply container, the bladder being fluidly coupled to the printhead maintenance system to receive waste fluids from the printhead maintenance station, wherein the at least one ink supply container comprises a plurality of ink supply containers, each ink supply container having a bladder positioned within the internal volume of the ink supply container, an input of each bladder of the plurality of ink supply containers being fluidly connected to one another and the at least one printhead maintenance station.

2. The inkjet printer of claim 1 further comprising:
a waste fluid reservoir that is fluidly connected to the at least one printhead maintenance station and the inputs of the bladders in the plurality of ink supply containers, the waste fluid reservoir being configured to receive waste fluids from the at least one printhead maintenance station and send the waste fluids from the waste fluid reservoir to at least one of the inputs of the bladders in the plurality of ink supply containers.

3. The inkjet printer of claim 2 further comprising:
a pneumatic device configured to move waste fluids out of the waste fluid reservoir.

4. The inkjet printer of claim 3 further comprising:
a controller operatively connected to the pneumatic device, the controller being configured to:
operate the pneumatic device on a timed periodic basis to move waste fluids from the waste fluid reservoir to the at least one input of the bladders in the ink supply containers.

5. The inkjet printer of claim 3 further comprising:
a fluid level detector configured to generate a signal indicative of a fluid level within the waste fluid reservoir; and
a controller operatively connected to the fluid level detector and the pneumatic device, the controller being configured to:
operate the pneumatic device when the fluid level detector generates a signal indicating the fluid level has reached a predetermined level.

6. The inkjet printer of claim 3 wherein the pneumatic device is a pump.

7. The inkjet printer of claim 3 wherein the bladder consists essentially of a flexible polymeric material.

8. The inkjet printer of claim 7 wherein the bladder hangs from the input to the bladder within the internal volume of the ink supply container in which the bladder is located without supporting structure within the volume of the ink supply container.

9. A method of operating an inkjet printer comprising:
performing at least one purge cycle on at least one printhead in the inkjet printer to produce waste fluids; and
directing the waste fluids into at least one ink supply container having a bladder positioned within an internal volume of the ink supply container, the at least one ink supply container including a plurality of ink supply containers with each ink supply container having the bladder positioned with the internal volume of the ink supply container, and an input of each bladder in the plurality of ink supply containers being fluidly connected to one another.

10. The method of claim 9 further comprising:
receiving the waste fluids in a waste fluid reservoir before directing the waste fluids to the input of each bladder in the ink supply containers in the plurality of ink supply containers.

11. The method of claim 10 further comprising:
operating a pneumatic device to move waste fluids out of the waste fluid reservoir into the plurality of bladders in the plurality of ink supply containers.

12. The method of claim 11 wherein the pneumatic device is operated on a timed periodic basis.

13. The method of claim 11 further comprising:
generating a signal indicative of a fluid level within the waste fluid reservoir; and
operating the pneumatic device when the generated signal indicates the fluid level has reached a predetermined level.

14. The method of claim 9 wherein directing waste fluids into the bladder increases an internal volume of the bladder.

15. The method of claim 9 wherein the bladder opens by unrolling or unfolding as the volume of ink within the housing decreases.

16. The method of claim 15 wherein each bladder of each ink supply container hangs from an input connector and is supported by a volume of ink within the ink supply container, wherein the bladder opens as the volume of ink within the ink supply container decreases.

17. An ink supply container for use in an inkjet printer comprising:
a housing having an internal volume configured to hold a volume of ink;
a bladder positioned within the internal volume of the housing; and
an input connector on the housing, the input connector being configured to enable waste fluid to enter the bladder positioned within the housing, wherein the bladder hangs from the input connector and the bladder and waste fluid therein is supported by the volume of ink within the housing, and wherein the bladder opens as the volume of ink within the housing decreases.

18. The ink supply container of claim 17 wherein the housing consists essentially of hard plastic.

19. The ink supply container of claim 18 wherein the hard plastic consists essentially of acetal, acrylic, polyimide, glass epoxy, thermoset plastic, high impact polystyrene, poly carbonate, or poly vinyl chloride.

20. The ink supply container of claim 18 wherein the bladder consists essentially of a flexible polymeric material.

21. The ink supply container of claim 20 wherein the flexible polymeric material consists essentially of high-density polyethylene (HDPE), polypropylene (PP), or linear low-density polyethylene (LLDPE).

22. The ink supply container of claim 20 wherein a thickness of the flexible polymeric material is within a range of 75 to 300 microns.

23. The ink supply container of claim 18 wherein the bladder hangs from the input connection without supporting structure within the internal volume of the housing.

24. The ink supply container of claim 23 wherein the bladder opens by unrolling as the volume of ink within the housing decreases.

25. The ink supply container of claim 23 wherein the bladder opens by unfolding as the volume of ink within the housing decreases.

26. The ink supply container of claim 17, the input connector further comprising:

a no-drip shutoff valve.

27. The ink supply container of claim 17, the input connector further comprising:

a one way valve.

* * * * *